United States Patent
Ejzak et al.

(10) Patent No.: US 7,535,889 B2
(45) Date of Patent: May 19, 2009

(54) SERVER COMPONENT REDIRECTION OF NEW MEDIA PATH PORTION BETWEEN PACKET-SWITCHED AND CIRCUIT-SWITCHED PORTIONS OF MOBILE SWITCHING CENTER

(75) Inventors: Richard Paul Ejzak, Wheaton, IL (US); Joseph James Lichter, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 914 days.

(21) Appl. No.: 10/459,288

(22) Filed: Jun. 11, 2003

(65) Prior Publication Data

US 2004/0252673 A1 Dec. 16, 2004

(51) Int. Cl.
*H04L 12/66* (2006.01)
*H04M 1/00* (2006.01)
(52) U.S. Cl. ........................ 370/352; 370/351; 370/353
(58) Field of Classification Search ................ 370/352, 370/353, 354, 356, 493, 316, 329, 349, 401, 370/389, 338, 494; 455/417
See application file for complete search history.

(56) References Cited

U.S. PATENT DOCUMENTS

| | | | | |
|---|---|---|---|---|
| 5,815,810 A | * | 9/1998 | Gallant et al. | 455/433 |
| 6,307,845 B1 | * | 10/2001 | Hummelgren et al. | 370/328 |
| 6,449,259 B1 | * | 9/2002 | Allain et al. | 370/253 |
| 6,504,839 B2 | * | 1/2003 | Valentine et al. | 370/354 |
| 6,868,080 B1 | * | 3/2005 | Umansky et al. | 370/354 |
| 7,003,287 B2 | * | 2/2006 | Roeder | 455/417 |
| 2001/0043588 A1 | | 11/2001 | Sallberg | |
| 2002/0006808 A1 | * | 1/2002 | Onaka et al. | 455/550 |
| 2002/0075846 A1 | * | 6/2002 | VALENTINE et al. | 370/352 |
| 2004/0203894 A1 | * | 10/2004 | Watanabe et al. | 455/456.1 |
| 2004/0204095 A1 | * | 10/2004 | Cyr et al. | 455/560 |

FOREIGN PATENT DOCUMENTS

| EP | 1 065 900 | 1/2001 |
|---|---|---|
| EP | 1 301 048 | 4/2003 |

* cited by examiner

*Primary Examiner*—Melur Ramakrishnaiah

(57) ABSTRACT

An apparatus in one example comprises a server component of a mobile switching center that causes a redirection of a portion of a new media path between a packet-switched portion of the mobile switching center and a circuit-switched portion of the mobile switching center.

35 Claims, 5 Drawing Sheets

SERVER COMPONENT REDIRECTION OF NEW MEDIA PATH PORTION BETWEEN PACKET-SWITCHED AND CIRCUIT-SWITCHED PORTIONS OF MOBILE SWITCHING CENTER

CROSS-REFERENCE TO RELATED APPLICATION

This application contains subject matter which is related to the subject matter of the following application, which is assigned to the same assignee as this application. The below-listed application is hereby incorporated herein by reference in its entirety:

"INTERNET PROTOCOL MULTIMEDIA SUBSYSTEM COMPONENT PROVIDING OF PACKET-SWITCHED SWITCHING FUNCTIONS TO SERVING MOBILE SWITCHING CENTER FEATURE SERVER," by Ejzak, Ser. No. 10/295,774, filed Nov. 14, 2002.

TECHNICAL FIELD

The invention relates generally to communications and more particularly to wireless communications.

BACKGROUND

Current wireless communication systems provide the ability for users to communicate to and from wireless or mobile users. There are generally two types of wireless communication systems, circuit-switched ("CS") and packet-switched ("PS").

In typical circuit-switched wireless communication systems, the mobile switching center ("MSC") connects the landline public switched telephone network ("PSTN") system to the wireless communication system. The mobile switching center is typically split into an mobile switching center server and a media gateway ("MGW"), and incorporates the bearer independent call control ("BICC") or the integrated services digital network user part ("ISUP") call control protocol for call delivery between mobile switching centers.

The current approach to introducing internet protocol ("IP") multimedia services for universal mobile telecommunications service ("UMTS") and code division multiple access ("CDMA") third generation ("3G") systems is to define a brand new internet protocol multimedia subsystem ("IMS"), comprised of a set of internet protocol connected network entities within the internet protocol multimedia subsystem using packet-switched services. These network entities provide internet protocol multimedia features and services using the session initiation protocol ("SIP") as the primary vehicle for call control.

The legacy circuit-switched communication system works with the internet protocol multimedia system to provide a more convenient upgrade path from the legacy circuit-switched communication system. The combined system provides packet-switched functionality to an existing circuit-switched communication system.

The gradual process of upgrading legacy circuit-switched communication systems to packet-switched communication systems creates a communication system where legacy circuit-switched portions and packet-switched portions co-exist. The legacy circuit-switched portions and the packet-switched portions are unable to handle every incoming call for the respective portion, for example, when the portion is at full capacity, when the recipient of the call is currently using a different portion of the communication system, or when the portion is unable to provide a desired feature or level of quality.

Thus, a need exists for a communication system with both packet-switched portions and legacy circuit-switched portions that can handle an incoming call for a given portion when the given portion is unable to handle the incoming call.

SUMMARY

The invention in one embodiment encompasses an apparatus. The apparatus comprises a server component of a mobile switching center that causes a redirection of a portion of a new media path between a packet-switched portion of the mobile switching center and a circuit-switched portion of the mobile switching center.

Another embodiment of the invention encompasses a method. A portion of a new media path for an incoming call is redirected between a packet-switched portion of a mobile switching center and a circuit-switched portion of the mobile switching center upon receipt of a call origination message for the incoming call.

A further embodiment of the invention encompasses an article. The article comprises one or more computer-readable signal-bearing media. The article includes means in the one or more media for redirection a portion of a new media path, for an incoming call, between a packet-switched portion of a mobile switching center and a circuit-switched portion of the mobile switching center upon receipt of a call origination message for the incoming call.

DESCRIPTION OF THE DRAWINGS

Features of exemplary implementations of the invention will become apparent from the description, the claims, and the accompanying drawings in which:

DETAILED DESCRIPTION

Figure 1:
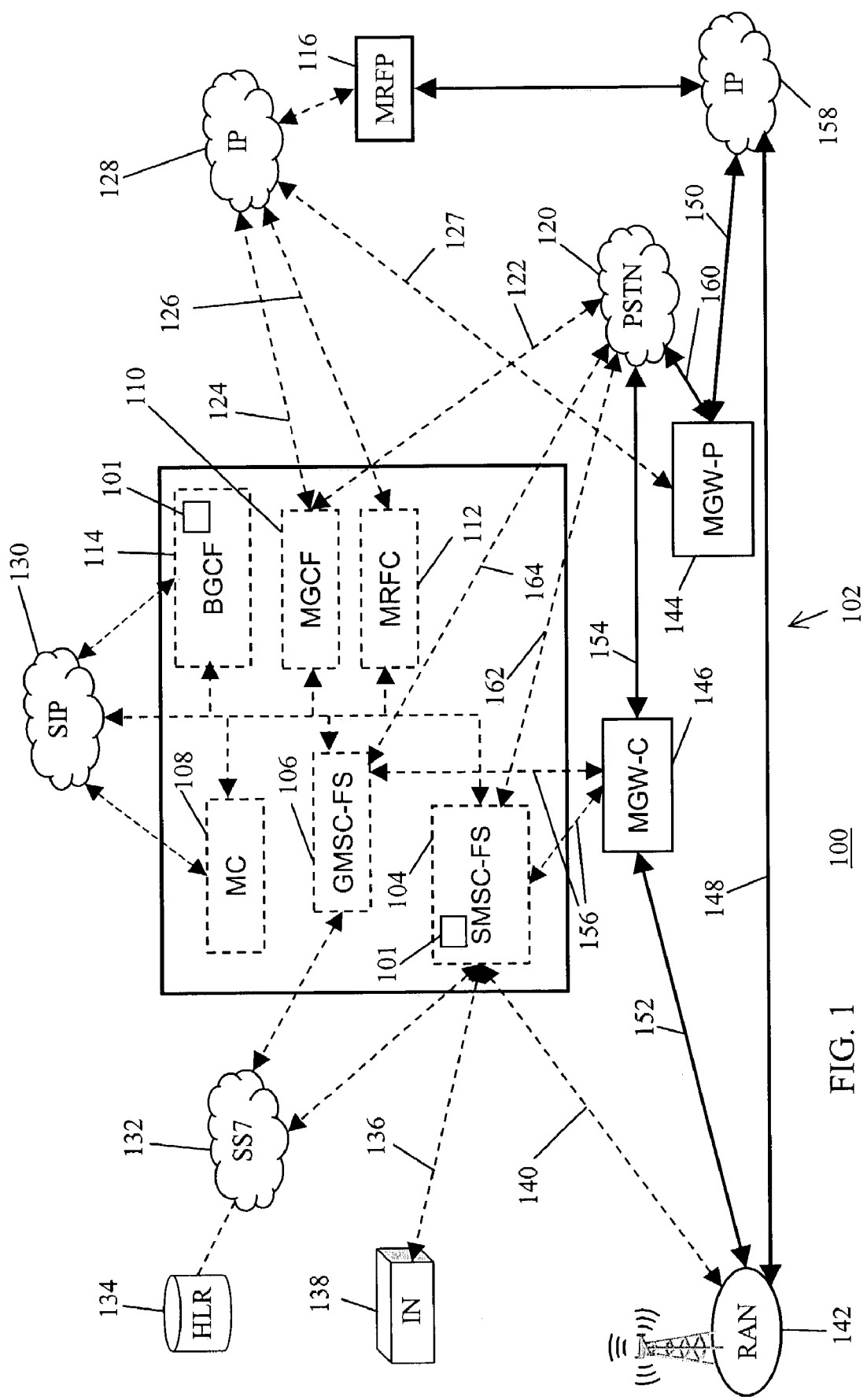
FIG. 1 is a representation of one example of an apparatus that comprises one or more mobile switching center service components and one or more internet protocol multimedia subsystem components.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more mobile switching centers 102, one or more gateway mobile switching center feature servers 106, one or more media coordinators 108, one or more media gateway control functions 110, one or more media resource function controllers 112, one or more media resource function processors 116, one or more public switched telephone networks 120, one or more integrated services digital network user part interfaces 122, one or more H.248 interfaces 124 and 126, one or more internet protocol networks 128, one or more session initiation protocol networks 130, one or more signaling system seven interfaces 132, one or more home location registers 134, one or more wireless intelligent network interfaces 136, one or more intelligent networks 138, one or more radio access network ("RAN") interfaces 140, and one or more radio access networks 142, as described in the above-incorporated application Ser. No. 10/295,774.

The mobile switching center 102 comprises a server component 104, for example, a serving mobile switching center feature server ("SMSC-FS"), as described in the above-incorporated application Ser. No. 10/295,774. The mobile switching center 102 further comprises a controller component 114. The server component 104 in one example comprises an instance of a recordable data storage medium 101, as described herein. The mobile switching center 102 further comprises a packet-switched media gateway 144 and a legacy circuit-switched media gateway 146.

The controller component 114 in one example comprises a breakout gateway control function ("BGCF"), as described in the above-incorporated application Ser. No. 10/295,774. The controller component 114 in one example comprises an instance of a recordable data storage medium 101, as described herein. The controller component 114 in one example employs one or more dialing plans to determine a portion of a new media path.

The server component 104 provides the mobile switching center 102 with functions of a serving mobile switching center with the exception of the functions provided by the one or more internet protocol multimedia subsystem components and the media coordinator 108. The server component 104 supports mobility management, subscriber feature control, call-related supplementary services, originating intelligent network ("IN") triggers, digit analysis, emergency service, charging, and media coordinator interface.

In one example, the server component 104 comprises a session initiation protocol user agent ("UA"). The server component 104 supports session initiation protocol call control procedures. The session initiation protocol call control procedures comprise session initiation protocol based call signaling, call routing, signaling interworking, and media processing. Additional instances of the server component 104 may support other call control protocols such as bearer independent call control ("BICC") or integrated services digital network user part ("ISUP"). The mobile switching center 102 may employ the additional instances of the server component 104 to support a plurality of call control protocols. The server component 104 in one example comprises an interface 162 to the public switched telephone network 120, for example, an integrated services digital network user part interface. For example, the server component 104 employs the interface 162 to the public switched telephone network 120 to implement a portion of a legacy mobile switching center. The server component 104 in a further example comprises an interface 156 to the legacy circuit-switched media gateway 146, for example, an H.248 interface or a legacy control protocol.

The server component 104 provides interworking between internal origination and termination call features and services, and an external session initiation protocol interface to the media coordinator 108. The external session initiation protocol interface supports communication of mobile-originated and mobile-terminated calls between the server component 104 and the remainder of the network. The external session initiation protocol interface also supports communication of media requests for tones, announcements, or conferencing between the server component 104 and the media coordinator 108. The communication of media requests between the server component 104 and the media coordinator 108 requires the definition of additional session initiation protocol headers or attachments in some cases. Unlike the session initiation protocol interfaces between other entities in the mobile switching center 102, the external session initiation protocol interface between the server component 104 and the media coordinator 108 will typically remain private to a single vendor, allowing the use of private session initiation protocol extensions using the X-header mechanism defined by the internet engineering task force ("IETF").

The gateway mobile switching center feature server 106 provides the mobile switching center 102 with services of a gateway mobile switching center through session initiation protocol call control procedures. In one example, the gateway mobile switching center feature server 106 comprises a session initiation protocol back-to-back user agent ("B2BUA"). The gateway mobile switching center feature server 106 supports session initiation protocol call control procedures. Additional instances of the gateway mobile switching center feature server 106 may support other call control protocols such as bearer independent call control or integrated services digital network user part. The mobile switching center 102 may employ the additional instances of the gateway mobile switching center feature server 106 to support a plurality of call control protocols. The gateway mobile switching center feature server 106 in one example comprises an interface 164 to the public switched telephone network 120, for example, an integrated services digital network user part interface. For example, the gateway mobile switching center feature server 106 employs the interface 164 to the public switched telephone network 120 to implement a portion of a legacy mobile switching center. The gateway mobile switching center feature server 106 in a further example comprises an interface 156 to the legacy circuit-switched media gateway 146, for example, an H.248 interface or a legacy control protocol.

The gateway mobile switching center feature server 106 supports terminating services, basic intersystem call delivery, terminating intelligent network triggers, secondary treatment, and charging. In one example, the gateway mobile switching center feature server 106 delivers call progress or service control indications to the calling party as out-of-band call progress information using session initiation protocol. The originating point in the network (i.e., the server component 104, the media coordinator 108, or the media gateway control function 110) converts the out-of-band call progress information to in-band call progress information. The call progress and service control indications are typically carried via existing session initiation protocol messages and headers, although additional session initiation protocol headers or attachments may be needed in some cases.

In one example, the media coordinator 108 comprises a session initiation protocol back-to-back user agent between the server component 104 and the network. For mobile telephone originated calls, the media coordinator 108 supports propagation of basic call state information between the server component 104 and the network. The media coordinator 108 supports conversion of out-of-band call progress or call-release information from the network to in-band call progress information toward the mobile telephone by allocation of resources of the media resource function controller 112 and the media resource function processor 116. The media coordinator 108 supports media negotiation between end-points in the network through allocation of resources of the media resource function controller 112 and the media resource function processor 116 as needed for media conversion. The media coordinator 108 supports control of forward cut-through of media when call is answered within the network. The media coordinator 108 supports session initiation protocol third party call control procedures to perform media functions under direction of the server component 104. The media functions comprise allocation of resources of the media resource function controller 112 and the media resource function processor 116 as needed to control conferencing, tones, announcements, or inter-system handoff.

For calls terminated at the mobile telephone, the media coordinator 108 supports propagation of basic call state information between the server component 104 and the network. The media coordinator 108 supports media negotiation between end-points in the network through allocation of resources of the media resource function controller 112 and the media resource function processor 116 as needed for media conversion. The media coordinator 108 supports session initiation protocol third party call control procedures to perform media functions under direction of the server component 104. The media functions include allocation of resources of the media resource function controller 112 and the media resource function processor 116 as needed to control conferencing, tones, announcements, or inter-system handoff.

The media gateway control function 110 serves as a call control interface and translator between the mobile switching center 102 and a public switched telephone network ("PSTN") 120 or another network. In one example, the media gateway control function 110 comprises a session initiation protocol user agent ("UA") for the mobile switching center 102. For example, the media gateway control function 110 converts between session initiation protocol call control messages of the mobile switching center 102 and bearer independent call control or integrated services digital network user part call control messages of the public switched telephone network 120. The media gateway control function 110 communicates with the public switched telephone network 120 via a communication link, for example, a bearer independent call control or integrated services digital network user part interface 122.

In one example, the media gateway control function 110 controls the packet-switched media gateway 144. The media gateway control function 110 comprises a signaling layer controller and the packet-switched media gateway 144 comprises a media layer controller. The media gateway control function 110 provides connection control for media channels in the media layer controlled by the packet-switched media gateway 144. The media gateway control function 110 controls the packet-switched media gateway 144 via a communication link, for example, a H.248 interface 124 through an internet protocol network 128.

In another example, the media gateway control function 110 controls a plurality of the packet-switched media gateways 144. The media gateway control function 110 controls the plurality of packet-switched media gateways 144 via one or more communication links, for example, one or more instances of the H.248 interface 124 to the internet protocol network 128. The plurality of the packet-switched media gateways 144 register with the media gateway control function 110. After registration with the media gateway control function 110 the plurality of packet-switched media gateways 144 can begin bearer processing. The media gateway control function 110 controls establishment of bearer resources for communications that require inter-working between the mobile switching center 102 and the public switched telephone network 120. The media gateway control function 110 requests allocation of ports for communications that require services of the packet-switched media gateway 144.

The media gateway control function 110 uses the H.248 interface 124 to the internet protocol network 128 to signal the packet-switched media gateway 144 to execute one or more media operations. The one or more media operations comprise registration of the packet-switched media gateway 144, bearer establishment control between the mobile switching center 102 and the public switched telephone network 120, request for allocation of media translation resources (i.e., compression, echo cancellation, and vocoding), control of events detected at the packet-switched media gateway 144, application of tones and announcements, and collection of statistics.

The media gateway control function 110 uses a session initiation protocol network 130 to accept commands from other signaling entities in the network. The media gateway control function 110 performs functions related to control of a call. The media gateway control function 110 provides for negotiation of media attributes with other end-points in the network. For calls originating in the public switched telephone network 120 and entering the mobile switching center 102, the media gateway control function 110 provides for conversion of out-of-band call progress information into in-band call progress information. The out-of-band call progress information comprises a signaling message that is not heard by a user during communication. The in-band call progress information comprises a signaling message that is heard by the user during communication. For example, the media gateway control function 110 provides for conversion of an out-of-band ringing indication to an in-band ringing tone. In another example, the media gateway control function 110 provides for conversion of an out-of-band network error indication (i.e., a session initiation protocol server internal error response message) to an in-band network error signal (i.e., a fast busy indication).

The controller component 114 comprises a signaling entity for call/session control. In one example, the controller component 114 comprises a session initiation protocol proxy server for the mobile switching center 102. In another example, the controller component 114 comprises a session initiation protocol redirect server or session initiation protocol back-to-back user agent. The controller component 114 selects the media gateway control function 110 to couple the mobile switching center 102 with the public switched telephone network 120. A call from a wireless telephone to a telephone in the public switched telephone network 120 comprises a signaling message. The signaling message comprises connection information of an address (i.e., an E.164 address) of the telephone in the public switched telephone network 120. The controller component 114 employs the E.164 address to locate an internet protocol network destination address of the call. In one example, the controller component 114 references an address translation table to find the internet protocol network destination address corresponding to the E.164 address. The address translation table may include other information needed to establish communication between the controller component 114 and the next hop destination for the signaling message, including port number, transport protocol, and security parameters. The controller component 114 sends the signaling message to the destination address.

The controller component 114 may use information from a plurality of sources to determine the destination address. The plurality of sources comprise the point of origination of the call within the network, location of the E.164 address, local policies and business agreements between the visited and home networks, desire to minimize path distance within the public switched telephone network 120 network, and a desire for the least-cost path.

The controller component 114 performs selection of the media gateway control function 110 based on the destination address, hiding of network information from other networks, and provision of security through authorization of peer network elements. When a first controller component 114 exists in a first network, a second controller component 114 exists in a second network, and the networks are coupled, then the first and the second controller components 114 may hide local network information from the other network.

The packet-switched media gateway 144 in one example comprises a media gateway as described in the above-incorporated application Ser. No. 10/295,774. The packet-switched media gateway 144 translates between a media flow (e.g., audio) on an internet protocol network 158 and a media flow on the public switched telephone network 120. The packet-switched media gateway 144 terminates circuit-switched ("CS") media from the public switched telephone network 120 and terminates internet protocol media flow as packet streams from another end-point in the mobile switching center 102. The packet-switched media gateway 144 in one example employs one or more instances of an H.248 interface 127 to the internet protocol network 128 to accept commands from other signaling entities in the network. The packet-switched media gateway 144 in one example comprises a packet-switched media path 150 to the internet protocol network 158. The internet protocol network 158 and the internet protocol network 128 in one example comprise a same internet protocol network. The packet-switched media gateway 144 further comprises a circuit-switched media path 160 to the public switched telephone network.

The legacy circuit-switched media gateway 146 in one example provides one or more instances of circuit-switched media paths 152 and 154 between the one or more public switched telephone networks 120 and the one or more radio access networks 142. The packet-switched media gateway 144 and the legacy circuit-switched media gateway 146 in one example can provide a media path 406 between each other via one or more of a portion of the public switched telephone network 120 and a time division multiplexed ("TDM") facility (not shown).

The server component 104 in one example causes the packet-switched media gateway 144 and the legacy circuit-switched media gateway 146 to redirect an incoming call for a mobile telephone from a first media path to a second media path, as described herein. The controller component 114 in one example performs an alternate routing to redirect an incoming call for a mobile telephone from a first media path to a second media path, as described herein.

Figure 2:
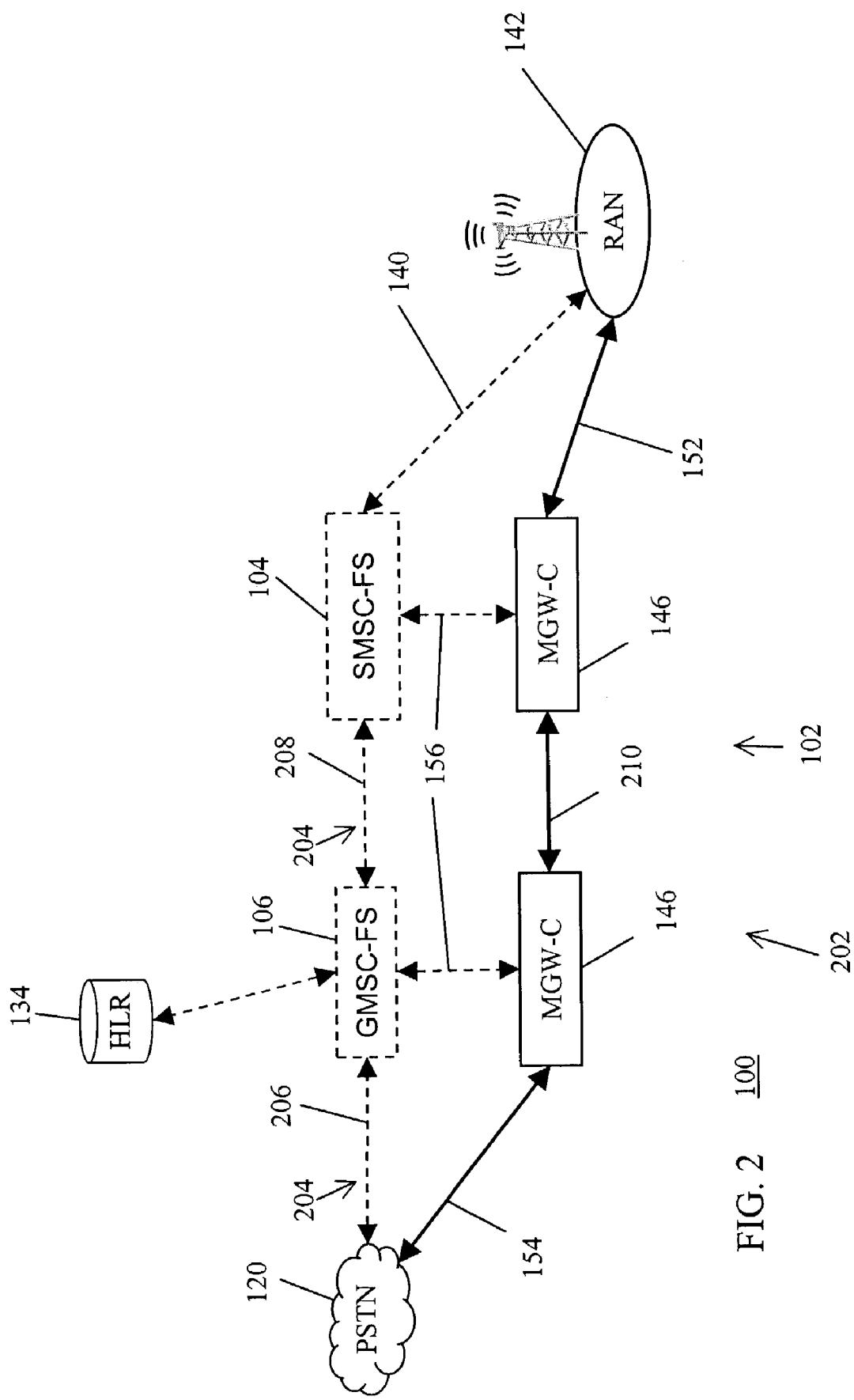
FIG. 2 is a representation of an exemplary media path configuration of the apparatus of FIG. 1 to handle an incoming circuit-switched call.

Turning to FIG. 2, an exemplary media path configuration 202 implements a portion of a legacy circuit-switched mobiles switching center configuration, as will be understood by those skilled in the art. The media path configuration 202 serves to handle an incoming call on the circuit-switched media path 154 from the public switched telephone network 120. The gateway mobile switching center feature server 106 receives a call origination message 204 for an incoming call from the public switched telephone network 120 through an interface 206. The interface 206 in one example comprises an integrated services digital network user part interface. The call origination message 204 comprises a directory number ("DN") for a destination, for example, a mobile telephone, of the incoming call. For example, the call origination message 204 comprises an integrated services digital network user part initial address message ("ISUP IAM"). The gateway mobile switching center feature server 106 employs the call origination message 204 to obtain an identifier of the mobile telephone from the home location register 134, for example, a temporary location directory number ("TLDN"). The gateway mobile switching center feature server 106 updates the call origination message 204 with the identifier. The gateway mobile switching center feature server 106 then sends the call origination message 204 to the server component 104 through an interface 208. In one example, the interface 208 comprises one or more of the interface 162, the interface 164, and a portion of the public switched telephone network 120. In another example, the interface 208 comprises a direct interface (not shown).

The gateway mobile switching center feature server 106 in one example signals a first instance of the legacy circuit-switched media gateway 146 through the interface 156 to direct the incoming call from the public switched telephone network 120 to a second instance of the legacy circuit-switched media gateway 146. In another example, the gateway mobile switching center feature server 106 and the first instance of the legacy circuit-switched media gateway 146 are co-located, and the interface 156 is not needed. The first instance of the legacy circuit-switched media gateway 146 directs the incoming call to the second instance of the legacy circuit-switched media gateway 146 through a circuit-switched media path 210. The circuit-switched media path 210 in one example comprises a portion of the public switched telephone network 120 and/or a time division multiplexed ("TDM") facility (not shown). In another example, the first instance of the legacy circuit-switched media gateway 146 and the second instance of the legacy circuit-switched media gateway 146 are co-located, and the circuit-switched media path 210 is unnecessary. The server component 104 employs one or more of the call origination message 204, the identifier, a dialing plan, and a routing function to determine a portion of a media path to the mobile telephone. For example, the server component 104 determines the portion of the media path as the circuit-switched path 152. The server component 104 employs the call origination message 204 to control media flow in the second instance of the legacy circuit-switched media gateway 146. The server component 104 controls the second instance of the legacy circuit-switched media gateway 146 through the interface 156. The server component 104 signals the radio access network 142 to receive the incoming call on the circuit-switched media path 152. The server component 104 signals the legacy circuit-switched media gateway 146 to direct the incoming call through the circuit-switched media path 152 to the radio access network 142.

Figure 3:
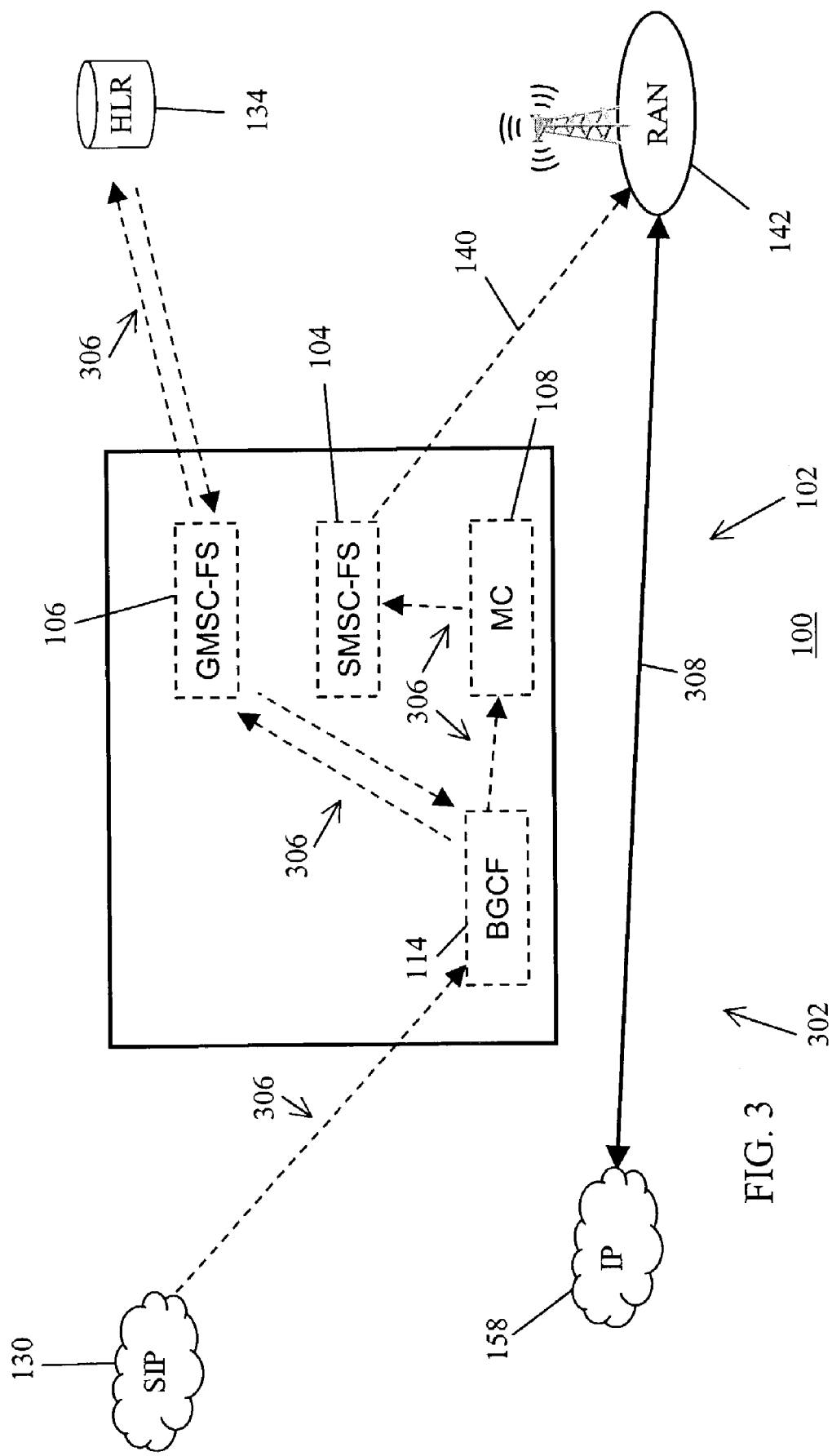
FIG. 3 is a representation of an exemplary media path configuration of the apparatus of FIG. 1 to handle an incoming packet-switched call.

Turning to FIG. 3, an exemplary media path configuration 302 serves to handle an incoming call on a packet-switched media path 308 from the internet protocol network 158, similar to a configuration described in the above-incorporated application Ser. No. 10/295,774. The packet-switched media path 308 in one example comprises one or more instances of the packet-switched media path 150 and the packet switched media path 148. In another example, the packet switched media path 308 comprises one or more instances of the packet-switched media path 150, the packet-switched media path 148, and one or more instances of the packet-switched media gateway 144. The control component 114 receives a session initiation protocol message 306 for the incoming call from the session initiation protocol network 130. For example, the session initiation protocol message 306 comprises a session initiation protocol INVITE request message. The session initiation protocol message 306 comprises a directory number ("DN") for a destination, for example, a mobile telephone, of the incoming call.

The controller component 114 employs a dialing plan and a routing function to send the session initiation protocol message 306 to the gateway mobile switching center feature server 106. The gateway mobile switching center feature server 106 obtains an identifier, for example, a temporary location directory number ("TLDN"), for the destination of the incoming call from the home location register 134. The gateway mobile switching center feature server 106 updates the session initiation protocol message 306 with the identifier. The gateway mobile switching center feature server 106 then sends the session initiation protocol message 306 to the controller component 114. The controller component 114 employs one or more of the session initiation protocol message 306, the identifier, a dialing plan, and a routing function to determine a next destination for the session initiation protocol message 306, for example, an instance of the media coordinator 108.

The controller component 114 sends the session initiation protocol message 306 to the media coordinator 108. The media coordinator 108 employs one or more characteristics of the session initiation protocol message 306 and subsequent signaling messages to determine whether to signal the media resource function controller 112 to allocate resources of the media resource function processor 116. The media coordinator 108 sends the session initiation protocol message 306 to the server component 104. The server component 104 signals the radio access network 142 to receive the incoming call on the packet-switched media path 308.

Figure 4:
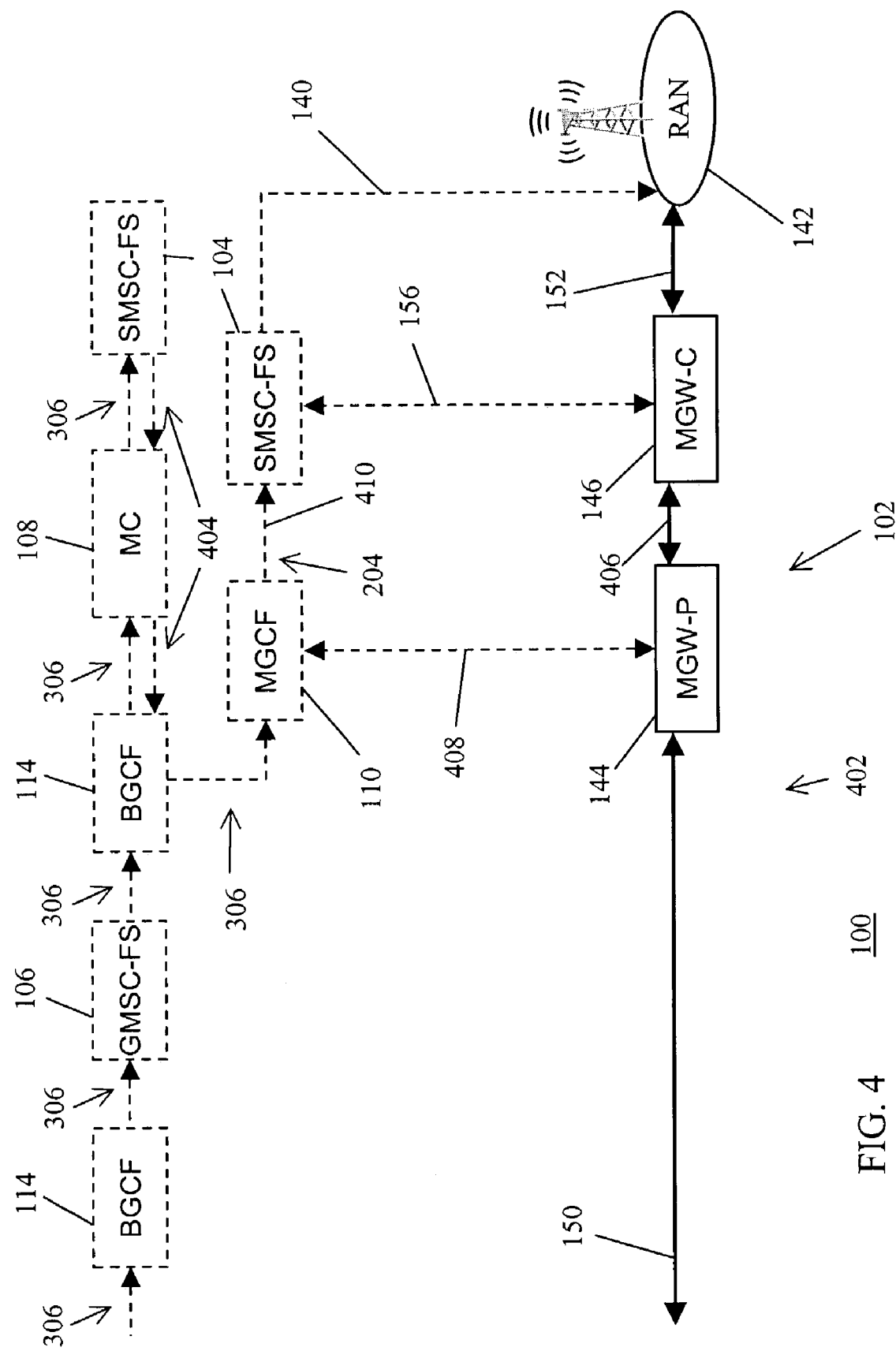
FIG. 4 is a representation of an exemplary media path configuration of the apparatus of FIG. 1 to redirect an incoming call from a packet-switched media path to a circuit-switched media path.

Turning to FIG. 4, an exemplary media path configuration 402 serves to handle an incoming call on a packet-switched media path, for example, the packet-switched media path 150 from the internet protocol network 158. The controller component ("BGCF") 114, the gateway mobile switching center feature server 106, and the media coordinator 108 initially function analogous to media path configuration 302 to determine a first media path, for example, through the packet-switched media path 150 and 148, through employment of a first dialing plan. When the media coordinator 108 sends the session initiation protocol message 306 to the server component ("SMSC-FS") 104, the server component 104 in one example cannot signal the radio access network 142 to receive the incoming call on the packet-switched media path 148. In one example, the packet-switched media path 148 and/or the radio access network 142 lack the capacity to handle the incoming call through a packet-switched media path. In another example, the mobile telephone is already receiving a call on a circuit-switched media path (e.g. call waiting). In yet another example, the packet-switched media path is not able to provide a service or level of quality desired by a user of the mobile telephone.

The server component 104 in one example sends a redirection message 404 to the media coordinator 108. The media coordinator 108 sends the redirection message 404 to the controller component 114 to perform an alternate routing to the mobile telephone. The redirection message 404 in one example comprises a first identifier of the mobile telephone, for example, the identifier of the session initiation protocol message 306. The server component 104 in one example determines a second identifier of the mobile telephone. The redirection message 404 in one example comprises one or more of a second dialing plan, the first identifier, and the second identifier. The redirection message 404 in one example comprises a session initiation protocol "302 Moved Temporarily" message.

The controller component 114 in one example employs one or more of the first dialing plan and the redirection message 404 to perform an alternate routing to the media gateway control function 110. The controller component 114 sends the session initiation protocol message 306 to the media gateway control function 110 to cause a redirection from the first media path to the second media path. For example, the controller component 114 signals the media gateway control function 110 to cause a redirection to a portion of the first media path from the packet-switched media gateway 144 to the legacy circuit-switched media gateway 146 through a circuit interface 406. The circuit interface 406 in one example comprises one or more of the circuit interface 160, the circuit interface 154, a portion of the public switched telephone network 120, and a time division multiplexed ("TDM") facility (not shown). The media gateway control function 110 signals the packet-switched media gateway 144 through an interface 408. The interface 408 in one example comprises the interface 124, a portion of the internet protocol network 128, and the interface 127. The media gateway control function 110 employs the session initiation protocol message 306 to create a call origination message 204. The controller component 114 sends the call origination message 204 to the server component 104 through an interface 410. The interface 410 in one example comprises one or more of the interface 122, a portion of the public switched telephone network 120, and the interface 162. The server component 104 employs the call origination message 204 to allocate one or more network resources, for example, the legacy circuit-switched media gateway 146. The server component 104 signals the legacy circuit-switched media gateway 146 to direct the incoming call through the circuit-switched media path 152 to the radio access network 142. The server component 104 signals the radio access network 142 to receive the incoming call through the circuit-switched media path 152.

Figure 5:
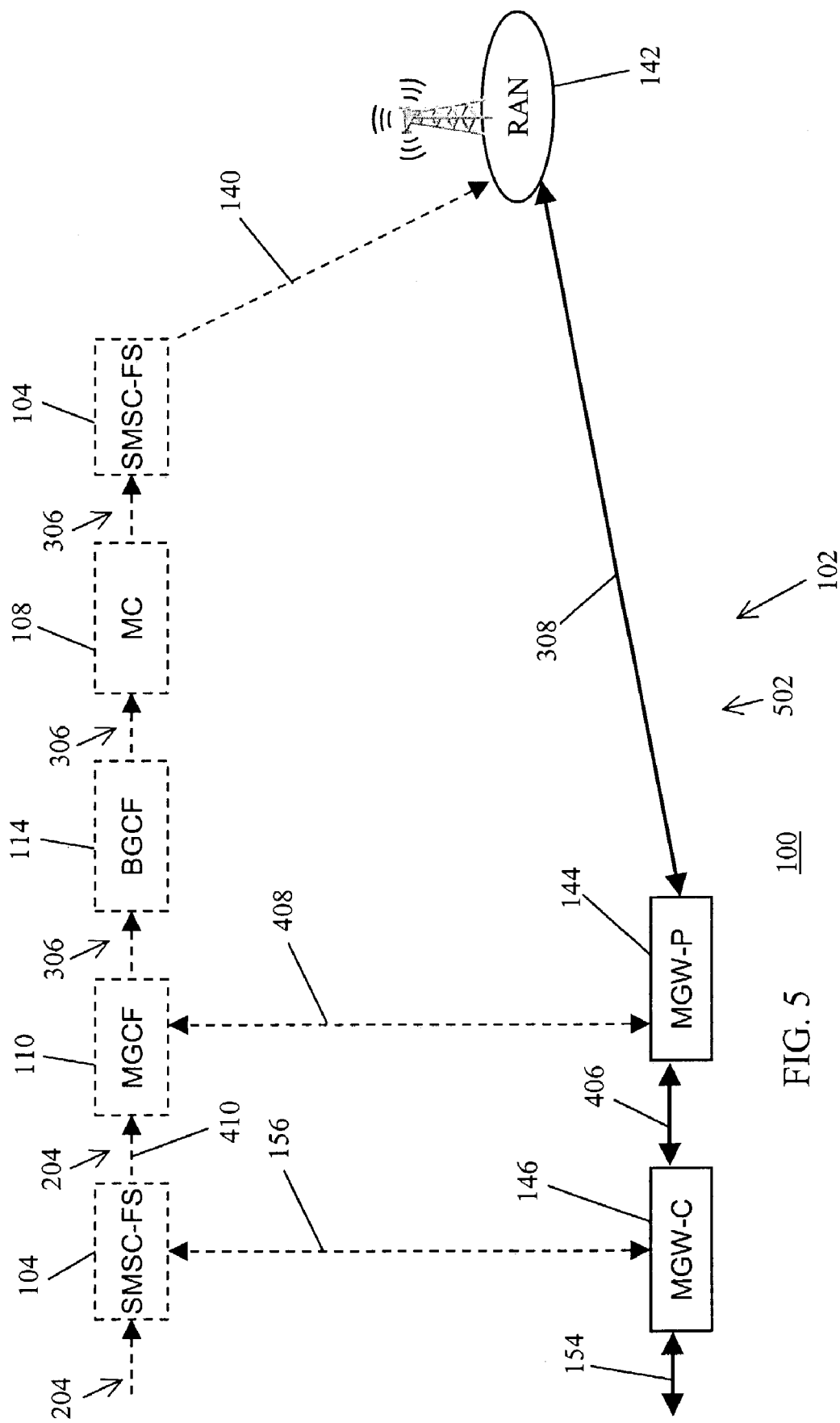
FIG. 5 is a representation of an exemplary media path configuration of the apparatus of FIG. 1 to redirect an incoming call from a circuit-switched media path to a packet-switched media path.

Turning to FIG. 5, an exemplary media path configuration 502 serves to handle an incoming call on a circuit-switched media path, for example, the circuit-switched media path 154 from the public switched telephone network 120. The server component ("SMSC-FS") 104 receives the call origination message 204 from the gateway server mobile switching center 106. The call origination message 204 comprises a first identifier for the mobile telephone.

The server component 104 employs one or more of the call origination message 204, the first identifier, and a first dialing plan to determine a first media path to the mobile telephone, for example, through the circuit-switched media paths 154 and 152. The server component 104 in one example cannot signal the radio access network 142 to receive the incoming call on the circuit-switched media path 152. In one example, the circuit-switched media path 152 and/or the radio access network 142 lack the capacity to handle the incoming call through a circuit-switched media path. In another example, the mobile telephone is already receiving a call on a packet-switched media path (e.g. call waiting). In yet another example, the circuit-switched media path is not able to provide a service or level of quality desired by a user of the mobile telephone.

The server component 104 determines a second media path to the mobile telephone. In a first example, the server component employs one or more of the call origination message 204, the first identifier, and the first dialing plan to determine the second media path to the mobile telephone. In a second example, the server component 104 employs one or more of the call origination message 204, the first identifier, and the second dialing plan to determine the second media path. In a third example, the server component 104 determines a second identifier of the mobile telephone. The server component 104 employs one or more of the call origination message 204, the second identifier, and the first dialing plan to determine the second media path. In another example, the server component 104 employs one or more of the call origination message 204, the second identifier, and the second dialing plan to determine the second media path.

The server component 104 determines the second media path, for example, through the circuit-switched media path 154 and the packet-switched media path 308. The server component 104 causes a portion of the first media path to be redirected to the second media path. For example, the server component 104 causes the legacy circuit-switched media gateway 146 to redirect a portion of the first media path to the packet-switched media gateway 144. The server component 104 sends the call origination message 204 to the media gateway control function 110 through the interface 410. The media gateway control function 110 employs the call origination message 204 to configure the packet-switched media gateway 144 through the interface 408. The media gateway control function 110 converts the call origination message 204 into a session initiation protocol message 306. The media gateway control function 110 sends the session initiation protocol message 306 to the controller component ("BGCF") 114. The controller component 114, the media coordinator 108, and the server component 104 then function analogous to the media path configuration 302, as will be appreciated by those skilled in the art.

The apparatus 100 in one example employs one or more computer-readable signal-bearing media. Examples of a computer-readable signal-bearing medium for the apparatus 100 comprise the recordable data storage medium 101 of the server component 104 and the recordable data storage medium 101 of the controller component 114. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a server component of a mobile switching center that causes a redirection, between a packet-switched portion of the mobile switching center and a circuit-switched portion of the mobile switching center, of a portion of a new media path, wherein the server component causes the redirection after receipt of a session initiation protocol message to complete an incoming call to a called mobile telephone and upon a determination that the called mobile telephone is already receiving a call on the circuit-switched portion.

2. The apparatus of claim 1, wherein the server component sends a redirection message to a controller component of the mobile switching center to cause the redirection of the portion of the new media path.

3. The apparatus of claim 2 in combination with the controller component,
wherein the controller component employs the redirection message to cause the redirection of the portion of the new media path from a first media path to a second media path.

4. The apparatus of claim 3, wherein the first media path comprises a media path through the packet-switched portion of the mobile switching center, and wherein the second media path comprises a media path through the circuit-switched portion of the mobile switching center; and
wherein the controller component performs an alternate routing to cause the redirection of the portion of the new media path from the media path through the packet-switched portion of the mobile switching center to the media path through the circuit-switched portion of the mobile switching center.

5. The apparatus of claim 3, wherein the first media path comprises a media path through the circuit-switched portion of the mobile switching center, and wherein the second media path comprises a media path through the packet-switched portion of the mobile switching center; and
wherein the controller component performs an alternate routing to cause the redirection of the portion of the new media path from the media path through the circuit-switched portion of the mobile switching center to the packet-switched portion of the mobile switching center.

6. The apparatus of claim 3, wherein the server component allocates one or more network resources for the second media path; and
wherein the controller component performs an alternate routing to cause the redirection of the portion of the new media path from the first media path to the second media path through the one or more network resources.

7. The apparatus of claim 3, wherein a calf origination message for the portion of the new media path comprises an identifier of a mobile telephone served by the mobile switching center, and wherein the first media path is based on one or more of the call origination message, the identifier, and the dialing plan; and
wherein the controller component employs one or more of the call origination message, the identifier, and a dialing plan to perform the alternate routing.

8. The apparatus of claim 3, wherein a call origination message for the portion of the new media path comprises an identifier of a mobile telephone served by the mobile switching center, and wherein the first media path is based on one or more of the call origination message, the identifier, and a first dialing plan; and
wherein the controller component employs one or more of the call origination message, the identifier, and the second dialing plan to perform the alternate routing.

9. The apparatus of claim 3, wherein a call origination message for the portion of the new media path comprises an identifier of a mobile telephone served by the mobile switching center, and wherein the first media path is based on one or more of the call origination message, the identifier, a the first dialing plan; and wherein the server component determines a second dialing plan; and wherein the controller component employs one or more of the call origination message, the identifier, and the second dialing plan to perform the alternate routing.

10. The apparatus of claim 3, wherein a call origination message for the portion of the new media path comprises a first identifier of a mobile telephone served by the mobile switching center, and wherein the first media path is based on one or more of the call origination message, the first identifier, and a dialing plan; and wherein the server component determines a second identifier of the mobile telephone; and wherein the controller component employs one or more of the call origination message, the second identifier, and the dialing plan to perform the alternate routing.

11. The apparatus of claim 3, wherein a call origination message for the portion of the new media path comprises a first identifier of a mobile telephone served by the mobile switching center, and wherein the first media path is based on one or more of the call origination message, the first identifier, and a first dialing plan; and wherein the server component determines a second identifier of the mobile telephone; and wherein the controller component employs one or more of the call origination message, the second identifier, and a second dialing plan to perform the alternate routing.

12. The apparatus of claim 3, wherein the server component performs the alternate routing.

13. The apparatus of claim 1, wherein the server component causes the redirection of the portion of the new media path from a first media path to a second media path.

14. The apparatus of claim 13, wherein the first media path comprises a media path through the packet-switched portion of the mobile switching center, and wherein the second media path comprises a media path through the circuit-switched portion of the mobile switching center; and wherein the server component causes the redirection of the portion of the new media path from the media path through the packet-switched portion of the mobile switching center to the media path through the circuit-switched portion of the mobile switching center.

15. The apparatus of claim 13, wherein the first media path comprises a media path through the circuit-switched portion of the mobile switching center, and wherein the second media path comprises a media path through the packet-switched portion of the mobile switching center; and wherein the server component causes the redirection of the portion of the new media path from the media path through the circuit-switched portion of the mobile switching center to the packet-switched portion of the mobile switching center.

16. The apparatus of claim 13, wherein the server component allocates one or more network resources for the second media path; and wherein the server component causes the redirection of the portion of the new media path from the first media path to the second media path through the one or more network resources.

17. The apparatus of claim 13, wherein a call origination message for the portion of the new media path comprises an identifier of a mobile telephone served by the mobile switching center, and wherein the first media path is based on one or more of the call origination message, the identifier, and a dialing plan; and wherein the server component employs one or more of the call origination message, the identifier, and the dialing plan to determine the second media path.

18. The apparatus of claim 13, wherein a call origination message for the portion of the new media path comprises an identifier of a mobile telephone served by the mobile switching center, and wherein the first media path is based on one or more of the calf origination message, the identifier, and a first dialing plan; and wherein the server component employs one or more of the call origination message, the identifier, and a second dialing plan to determine the second media path.

19. The apparatus of claim 13, wherein a call origination message for the portion of the new media path comprises a first identifier of a mobile telephone served by the mobile switching center, and wherein the first media path is based on one or more of the call origination message, the first identifier, and a dialing plan; and wherein the server component determines a second identifier of the mobile telephone; and wherein the server component employs one or more of the call origination message, the second identifier, and the dialing plan to determine the second media path.

20. The apparatus of claim 13. wherein a call origination message for the portion of the new media path comprises a first identifier of a mobile telephone served by the mobile switching center, and wherein the first media path is based on one or more of the call origination message, the first identifier, and a first dialing plan; and wherein the server component determines a second identifier of the mobile telephone; and wherein the server component employs one or more of the call origination message, the second identifier, and a second dialing plan to determine the second media path.

21. The apparatus of claim 1, wherein the server component supports bearer independent call control (BICC) protocol.

22. The apparatus of claim 1, wherein the redirection comprises a session initiation protocol message.

23. A method, comprising the steps of:

redirecting a portion of a new media path, for an incoming call, between a packet-switched portion of a mobile switching center and a circuit-switched portion of the mobile switching center upon receipt of a call origination message for the incoming call; and performing the redirecting step after receipt of a session initiation protocol message to complete the incoming call to a called mobile telephone and upon a determination that the called mobile telephone is already receiving a call on the circuit-switched portion.

24. The method of claim 23, further comprising the step of:
determining the second media path, wherein the first media path and the second media path comprise different media paths.

25. The method of claim 23, further comprising the step of:
sending a redirection message to a controller component to cause a redirection of the portion of the new media path from a first media path to a second media path.

26. The method of claim 25. wherein the first media path is based on an identifier and a first dialing plan, and wherein the step of determining the second media path comprises the steps of:
determining a second dialing plan;
determining the second media path based on the identifier and a second dialing plan.

27. The method of claim 25 wherein the first media path is based on a first identifier and a dialing plan, and wherein the step of determining the second media path comprises the steps of:
  determining a second identifier;
  determining the second media path based on the second identifier and the dialing plan.

28. The method of claim 25, wherein the first media path is based on a first identifier and a first dialing plan, and wherein the step of determining the second media path comprises the steps of:
  determining a second identifier;
  determining a second dialing plan;
  determining the second media path based on the second identifier and the second dialing plan.

29. A computer-readable medium having computer executable instructions for performing steps, comprising:
  means in the one or more media for redirecting a portion of a new media path, for an incoming call, between a packet-switched portion of a mobile switching center and a circuit-switched portion of the mobile switching center upon receipt of a call origination message for the incoming call; and
  means in the one or more media for performing the redirecting after receipt of a session initiation protocol message to complete the incoming call to a called mobile telephone and upon a determination that the called mobile telephone is already receiving a call on the circuit-switched portion.

30. An apparatus, comprising:
  a server component of a mobile switching center that causes a redirection, between a packet-switched portion of the mobile switching center and a legacy circuit-switched portion of the mobile switching center, of a portion of a new media path for a call to a mobile telephone;
  wherein the server component causes the redirection of the portion of the new media path from a first media path to a second media path after receipt of a session initiation protocol message to complete the call to the mobile telephone along the first media path and after a determination that the first media path is unable to currently handle the call to the mobile telephone.

31. The apparatus of claim 30, wherein the determination comprises a determination that the first media path lacks a capacity to handle the call, the mobile telephone is already receiving another call through the second media path, and/or the first media path is not able to provide a service or level of quality desired by a user of the mobile telephone.

32. The apparatus of claim 30, wherein the server component determines the second media path; and
  wherein the first media path comprises a media path through the legacy circuit-switched portion of the mobile switching center, and wherein the second media path comprises a media path through the packet-switched portion of the mobile switching center.

33. The apparatus of claim 32, wherein the server component receives a call origination message that comprises a first identifier of the mobile telephone; and
  wherein the server component determines the media path through the packet-switched portion of the mobile switching center through employment of one or more of the call origination message, the first identifier of the mobile telephone, and a first or second dialing plan.

34. The apparatus of claim 32, wherein the server component receives a call origination message that comprises a first identifier of the mobile telephone; and
  wherein the server component determines a second identifier of the mobile telephone; and
  wherein the server component determines the media path through the packet-switched portion of the mobile switching center through employment of one or more of the call origination message, the second identifier, and a first or a second dialing plan.

35. The apparatus of claim 30, wherein the first media path comprises a media path through the packet-switched portion of the mobile switching center, and wherein the second media path comprises a media path through the circuit-switched portion of the mobile switching center; and
  wherein a controller component performs an alternate routing to cause the redirection of the portion of the new media path from the media path through the packet-switched portion of the mobile switching center to the media path through the circuit-switched portion of the mobile switching center.

* * * * *